US012025727B2

(12) United States Patent
Bourdoux et al.

(10) Patent No.: US 12,025,727 B2
(45) Date of Patent: Jul. 2, 2024

(54) RADAR RANGING

(71) Applicant: IMEC VZW, Leuven (BE)

(72) Inventors: Andre Bourdoux, Theux (BE); Marc Bauduin, Brussels (BE)

(73) Assignee: Imec vzw, Leuven (BE)

(*) Notice: Subject to any disclaimer, the term of this patent is extended or adjusted under 35 U.S.C. 154(b) by 157 days.

(21) Appl. No.: 17/127,111

(22) Filed: Dec. 18, 2020

(65) Prior Publication Data

US 2021/0190904 A1  Jun. 24, 2021

(30) Foreign Application Priority Data

Dec. 18, 2019  (EP) ..................................... 19217422

(51) Int. Cl.
*G01S 7/28* (2006.01)
*G01S 7/02* (2006.01)
(Continued)

(52) U.S. Cl.
CPC .......... *G01S 7/2813* (2013.01); *G01S 13/288* (2013.01); *G01S 13/505* (2013.01); *G01S 13/89* (2013.01); *G01S 7/0233* (2021.05); *G01S 13/584* (2013.01)

(58) Field of Classification Search
CPC ........ G01S 7/023; G01S 7/0233; G01S 7/388; G01S 13/325; G01S 13/584; G01S 13/288; G01S 13/284; G01S 13/89
(Continued)

(56) References Cited

U.S. PATENT DOCUMENTS 5,151,702 A     9/1992  Urkowitz
6,085,151 A *   7/2000  Farmer .................. G01S 7/0234
                                                   701/96
(Continued)

FOREIGN PATENT DOCUMENTS

CN      101330356 A    12/2008
CN      106685474 A     5/2017
(Continued)

OTHER PUBLICATIONS

Extended European Search Report and Written Opinion, EP Application No. 19217422.5, dated Mar. 13, 2020, 12 pages.
(Continued)

*Primary Examiner* — Ladimir Magloire
*Assistant Examiner* — Michael W Justice
(74) *Attorney, Agent, or Firm* — McDonnell Boehnen Hulbert & Berghoff LLP (57) ABSTRACT

A method of radar ranging comprises transmitting a digitally-modulated signal comprising successively in time, for each sequence in a plurality N of sequences, a plurality M+1 of repeats of said sequence, wherein each said sequence consists of a plurality $L_c$ of digitally-modulated chips, wherein at least one sequence in the plurality of sequences is different from another sequence in said plurality of sequences; receiving a version of the digitally-modulated signal reflected scattered by one or more physical targets; for each sequence in the plurality of sequences, performing a preliminary target estimation; and using each said preliminary target estimation for all sequences in the plurality of sequences, performing a final target estimation.

17 Claims, 6 Drawing Sheets

(51) Int. Cl.
*G01S 13/28* (2006.01)
*G01S 13/50* (2006.01)
*G01S 13/58* (2006.01)
*G01S 13/89* (2006.01)

(58) Field of Classification Search
USPC .......................................... 342/379, 27, 202
See application file for complete search history.

(56) References Cited

U.S. PATENT DOCUMENTS

| | | | | |
|---|---|---|---|---|
| 6,392,588 | B1* | 5/2002 | Levanon | G01S 13/288 |
| | | | | 342/202 |
| 6,989,782 | B2* | 1/2006 | Walker | G01S 13/284 |
| | | | | 342/134 |
| 7,639,171 | B2* | 12/2009 | Alland | H01Q 3/24 |
| | | | | 342/25 R |
| 8,553,808 | B2* | 10/2013 | Luthra | H03M 1/1265 |
| | | | | 375/295 |
| 8,665,985 | B1* | 3/2014 | Piesinger | H04L 27/3483 |
| | | | | 375/268 |
| 9,772,397 | B1* | 9/2017 | Bordes | G01S 7/0232 |
| 9,791,551 | B1* | 10/2017 | Eshraghi | G01S 7/0232 |
| 9,945,935 | B2* | 4/2018 | Eshraghi | G01S 13/325 |
| 9,954,955 | B2* | 4/2018 | Davis | G01S 13/34 |
| 9,989,627 | B2* | 6/2018 | Eshraghi | G01S 13/931 |
| 10,191,142 | B2* | 1/2019 | Eshraghi | G01S 13/325 |
| 10,241,581 | B2* | 3/2019 | Lien | G01S 7/415 |
| 10,324,165 | B2* | 6/2019 | Bordes | G01S 13/325 |
| 10,551,482 | B2* | 2/2020 | Eshraghi | G01S 7/4021 |
| 10,775,493 | B2* | 9/2020 | Santra | G01S 13/904 |
| 10,805,135 | B2* | 10/2020 | Lang | G01S 13/931 |
| 10,817,070 | B2* | 10/2020 | Lien | G01S 13/58 |
| 11,031,978 | B2* | 6/2021 | Klemmer | H04B 7/0421 |
| 11,054,516 | B2* | 7/2021 | Wu | G01S 7/354 |
| 11,099,267 | B2* | 8/2021 | Wu | G01S 13/582 |
| 11,175,377 | B2* | 11/2021 | Bordes | G01S 7/0235 |
| 11,194,016 | B2* | 12/2021 | Eshraghi | G01S 13/87 |
| 11,320,518 | B2* | 5/2022 | Mende | G01S 7/023 |
| 11,360,204 | B2* | 6/2022 | Hakobyan | G01S 13/325 |
| 11,428,796 | B2* | 8/2022 | Nam | G01S 13/536 |
| 2005/0179585 | A1* | 8/2005 | Walker | G01S 13/282 |
| | | | | 342/134 |
| 2008/0143573 | A1* | 6/2008 | Luthra | H04L 27/265 |
| | | | | 327/91 |
| 2009/0103593 | A1* | 4/2009 | Bergamo | H04B 7/086 |
| | | | | 375/E1.002 |
| 2014/0003556 | A1* | 1/2014 | Luthra | H04L 27/265 |
| | | | | 375/340 |
| 2016/0320853 | A1* | 11/2016 | Lien | G01S 13/66 |
| 2017/0307728 | A1* | 10/2017 | Eshraghi | G01S 7/282 |
| 2017/0307729 | A1* | 10/2017 | Eshraghi | G01S 7/2813 |
| 2017/0310758 | A1* | 10/2017 | Davis | H04B 1/69 |
| 2018/0031674 | A1* | 2/2018 | Bordes | G01S 7/0234 |
| 2018/0031675 | A1* | 2/2018 | Eshraghi | G01S 13/347 |
| 2018/0095163 | A1* | 4/2018 | Lovberg | G01S 13/325 |
| 2018/0241822 | A1* | 8/2018 | Davis | G01S 13/87 |
| 2018/0259619 | A1* | 9/2018 | Eshraghi | G01S 13/87 |
| 2018/0329027 | A1* | 11/2018 | Eshraghi | G01S 7/038 |
| 2019/0154796 | A1* | 5/2019 | Eshraghi | G01S 7/352 |
| 2019/0155396 | A1* | 5/2019 | Lien | G01S 13/89 |
| 2019/0170855 | A1* | 6/2019 | Keller | G01S 7/2926 |
| 2019/0302224 | A1* | 10/2019 | Bordes | G01S 7/0232 |
| 2019/0302253 | A1* | 10/2019 | Santra | G01S 13/64 |
| 2020/0052941 | A1* | 2/2020 | Lang | G01S 7/0234 |
| 2020/0081110 | A1* | 3/2020 | Nam | G01S 13/536 |
| 2020/0119780 | A1* | 4/2020 | Klemmer | H04B 7/0421 |
| 2020/0182991 | A1* | 6/2020 | Hakobyan | H04B 7/0413 |
| 2020/0191939 | A1* | 6/2020 | Wu | G01S 7/354 |
| 2020/0191940 | A1* | 6/2020 | Wu | H04B 7/0413 |
| 2020/0379100 | A1* | 12/2020 | Kitamura | G01S 13/72 |
| 2020/0409472 | A1* | 12/2020 | Lien | G01S 13/88 |
| 2021/0263134 | A1* | 8/2021 | Mende | G01S 7/40 |

FOREIGN PATENT DOCUMENTS

| | | | |
|---|---|---|---|
| EP | 1971097 A2 | 9/2008 | |
| FR | 2888336 A1 | 1/2007 | |
| JP | 6177467 B1 * | 8/2017 | ........... G01S 13/524 |

OTHER PUBLICATIONS

Ahmad, U., D. Guermandi, A. Medra, W. Van Thillo, and A. Bourdoux. "Impact of even and odd order non-linearity on PMCW radars." In 2016 IEEE Radar Conference (RadarConf), pp. 1-5. IEEE, 2016.

* cited by examiner

RADAR RANGING

CROSS-REFERENCE TO RELATED APPLICATIONS

The present application is a non-provisional patent application claiming priority to European Patent Application No. EP 19217422.5, filed Dec. 18, 2019, the contents of which are hereby incorporated by reference.

FIELD OF THE DISCLOSURE

The present disclosure relates to methods of radar ranging, to a method of transmitting a signal for radar ranging, to a radar transmitter, and to a radar receiver.

BACKGROUND

Digitally-modulated radar systems and methods are known. They can be used for a wide variety of indoor and outdoor applications, such as civilian, automotive, defense, and space applications.

Such systems and methods involve the transmission of a digitally-modulated signal, comprising a sequence of digitally modulated chips.

Modulation methods may include phase-modulation (PM) or orthogonal frequency division multiplex (ODFM), including phase-modulated continuous wave (PMCW) and orthogonal frequency division multiplex continuous wave (ODFM-CW) transmission.

Such radar systems and methods may be single-input, single-output (SISO), comprising a single transmitter and a single receiver, or multiple-input multiple-out (MIMO), comprising a plurality of transmitters and a plurality of receivers.

Through processing of a received digitally-modulated signal scattered by one or more targets, range information related to the target may be reconstructed. Further, through, respectively, angular processing and Doppler processing, angle and speed information regarding the target(s) may be reconstructed.

Due to system non-idealities, e.g., non-ideal transmitters and/or receivers, the ideal response of such reconstruction may be degraded, typically manifested through the appearance of ghost targets and/or an increase of sidelobes. Typical sources of non-idealities are phase noise, IQ mismatch, non-linearities and ADC/DAC integral or differential non-linearity and clipping. Further, Doppler shifts, due to relative target motion with respect to the radar can lead to sidelobe degradation.

SUMMARY

Embodiments of the present disclosure provide a method of radar ranging less sensitive to ghosting and/or sidelobe degradation.

To this end, according to a first aspect, there is provided a method of radar ranging, comprising transmitting a digitally-modulated signal comprising, successively in time, for each sequence in a plurality $N_{seq}$ of sequences, a plurality $M+1$ of repeats of the said sequence, wherein each such sequence consists of a plurality $L_c$ of digitally-modulated chips, wherein at least one sequence in the plurality of sequences is different from another sequence in the plurality of sequences; receiving a version of the digitally-modulated signal scattered by one or more physical targets; for each sequence in the plurality of sequences, performing a preliminary target estimation; and using each said preliminary target estimation for all sequences in the plurality of sequences, performing a final target estimation Target estimation in the method of radar ranging should be understood as an estimation of any parameter related to a location or a speed of a target, such as range, speed, or angle. For example, it may comprise estimation of a profile as a function of one or more of such variables, for example a binned profile.

Transmitting a digitally-modulated signal should be understood as including the case of simultaneous and/or alternating transmission by several transmitters, for example in MIMO operation.

Further, it should be understood to include the case of the sequence transmitted being modified by an outer code, for example in MIMO operation.

As sequence, should be understood any succession of digital-modulation chips. In some examples, each single sequence is selected to have as low auto-correlation as possible.

A first sequence being different from a second sequence should be understood as the first sequence and the second sequence being different for every possible cyclic shift.

The number of repeats of each sequence may be the same for each sequence, or different.

The number of chips in each sequence may be the same for each sequence, or different.

Different sequences of the same length may exhibit different degradations (ghost or sidelobe degradation) in the presence of system non-idealities. Instead of repeatedly transmitting the same sequence, which may repeatedly result in identical ghosts or sidelobe degradation, through changing the transmitted sequence, by at least one sequence being different to another sequence, such ghosts or sidelobe degradations, may cancel out, attenuating the effect of receiver non-idealities.

Thus, performing a preliminary target estimation for each sequence and using each such preliminary target estimation for the final target estimation, where at least one sequence of the plurality of sequences is different from another sequence in the plurality of sequences, the effect of ghosts and sidelobes in the target estimation, for example due to transmitter and/or receiver non-idealities and target movement, may be considerably reduced.

Hereby, for given system performance requirements, regarding the level of ghosts and/or sidelobes, the transmitter and/or receiver requirements regarding the level of imperfections may be significantly reduced. Since the method can be implemented without any additional hardware, this may reduce total complexity. Alternately, for given transmitter and/or receiver requirements, the system performance may be considerably raised.

The digitally-modulated signal may comprise any digitally-modulated waveform where several different waveforms of a given length are available, such as phase modulation (PM) or orthogonal frequency division multiplex (OFDM) modulation.

The method can be used in continuous transmission radars (CW) or pulsed radars with intra-pulse modulation.

The method is equally applicable to SISO or MIMO operation.

The order of sequences in the plurality of sequences may be randomized. This can be used as mean to randomize the interference created to other radar systems.

According to an embodiment, each sequence in the plurality of sequences is different from every other sequence of the plurality of sequences. This may maximize the effect of canceling out ghosts and sidelobe degradations.

According to an embodiment, each sequence in each said sequence in the plurality of sequences is an m-sequence or an almost-perfect sequence, APS.

According to an embodiment, the digitally-modulated signal is modulated using phase-modulated continuous wave, PMCW, modulation.

According to an embodiment, each said digitally-modulated chip signifies either transmission of a nominal phase carrier or transmission of a reversed-phase carrier.

According to an embodiment, the digitally-modulated signal is modulated using orthogonal frequency division multiplex, OFDM, modulation.

According to an embodiment, each said digitally-modulated chip signifies, for each OFDM sub-carrier, a phase shift, each said OFDM sub-carrier having a same amplitude.

According to an embodiment, each said preliminary target estimation is a target range profile and/or the final target estimation is a range-doppler map or a range-doppler-angle map, such as a range-doppler-azimuth-elevation map.

According to an embodiment, the method is employed for multiple-in multiple-out, MIMO, radar ranging.

According to an embodiment, the digitally modulated signal is concurrently transmitted by a plurality of transmitters, wherein each sequence of the plurality of sequences, as transmitted by each transmitter of the plurality of transmitters, is modified by an orthogonal outer code.

According to an embodiment, the sequences of the plurality of sequences of the digitally modulated signal are alternatingly transmitted by each transmitter of a plurality of transmitters.

According to a second aspect, there is provided a method of transmitting a signal for radar ranging, comprising transmitting a digitally-modulated signal comprising, successively in time, for each sequence in a plurality $N_{seq}$ of sequences, a plurality M+1 of repeats of the sequence, wherein each said sequence consists of a plurality $L_c$ of digitally-modulated chips, wherein at least one sequence in the plurality of sequences is different from another sequence in the plurality of sequences.

Effects and features of this aspect are analogous to those described above in connection with the first aspect. Embodiments mentioned in relation to the first aspect are compatible with this aspect.

According to a third aspect, there is provided a radar transmitter configured to transmit a digitally-modulated signal comprising, successively in time, for each sequence in a plurality $N_{seq}$ of sequences, a plurality M+1 of repeats of the sequence, wherein each said sequence consists of a plurality $L_c$ of digitally-modulated chips, wherein at least one sequence in the plurality of sequences is different from another sequence in the plurality of sequences transmitted.

Effects and features of this aspect are analogous to those described above in connection with the first aspect. Embodiments mentioned in relation to the first aspect are compatible with this aspect.

According to a fourth aspect, there is provided a method of radar ranging, comprising receiving a scattered digitally-modulated signal comprising, successively in time, for each sequence in a plurality $N_{seq}$ of sequences, a plurality M+1 of repeats of the sequence, wherein each said sequence consists of a plurality $L_c$ of digitally-modulated chips, wherein at least one sequence in the plurality of sequences is different from another sequence in the plurality of sequences; for each sequence in the plurality of sequences, performing a preliminary target estimation; and using each said preliminary target range estimation for all sequences in the plurality of sequences, performing a final target estimation.

Effects and features of this aspect are analogous to those described above in connection with the first aspect. Embodiments mentioned in relation to the first aspect are compatible with this aspect.

According to a fifth aspect, there is provided a receiver for radar ranging, configured to receive a scattered digitally-modulated signal comprising, successively in time, for each sequence in a plurality $N_{seq}$ of sequences, a plurality M of repeats of the sequence, wherein each said sequence consists of a plurality $L_c$ of digitally-modulated chips, wherein at least one sequence in the plurality of sequences is different from another sequence in the plurality of sequences; for each sequence in the plurality of sequences, perform a preliminary target estimation; and using each said preliminary target range estimation for all sequences in said plurality of sequences, perform a final target estimation.

Effects and features of this aspect are analogous to those described above in connection with the first aspect. Embodiments mentioned in relation to the first aspect are compatible with this aspect.

BRIEF DESCRIPTION OF THE FIGURES

The above, as well as additional, features will be better understood through the following illustrative and non-limiting detailed description of example embodiments, with reference to the appended drawings.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Figure 1:
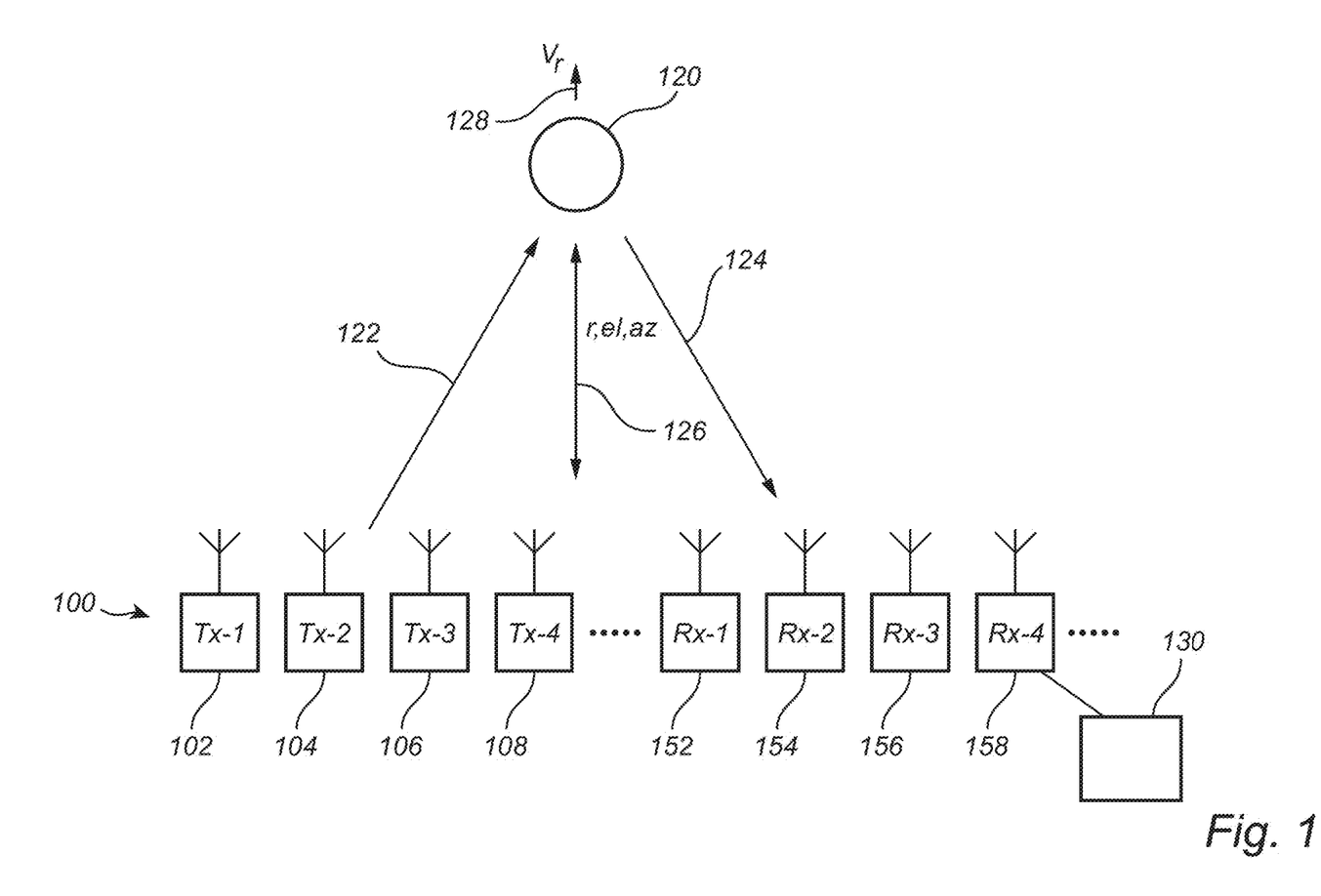
FIG. 1 schematically shows a radar system.

FIG. 1 schematically shows a radar system 100. A first transmitter TX-1 102 may transmit radar signals 122, which may be scattered, such as reflected, by one or more physical target, in FIG. 1 represented by a single physical target 120. Radar signals 124 scattered by the one or more targets 120 may be received by a first receiver RX-1 152.

Optionally, for example in the case of multiple-in multiple-out (MIMO) radar ranging, the radar signals 122 may be transmitted by a plurality of transmitters, as exemplified in FIG. 1 by a first transmitter TX-1 102, a second transmitter TX-2 104, a third transmitter TX-3 106, and a fourth transmitter TX-4 108.

Likewise, the radar signals 124 scattered by the one or more targets 120 may be received by a plurality of receivers, as exemplified in FIG. 1 by receivers RX-1 152, RX-2 154, RX-3 156, and RX-4 158.

By processing of the radar signals 124 scattered by the target 120 and received by one or more of the receivers 152, 154, 156, 158, a processor 130 may perform target estimation regarding the target 120. The target estimation may involve one or more quantities related to the position 126 of the target 120, such as a distance r 126 to the target 120, and/or an elevation angle el of the target 120, and/or an azimuth angle az of the target 120. Further, the target estimation may involve one or more quantities related to movement 128 of the target 120, such as a radial velocity $v_r$, i.e. a radial component of the velocity of the target 120.

Figure 2:
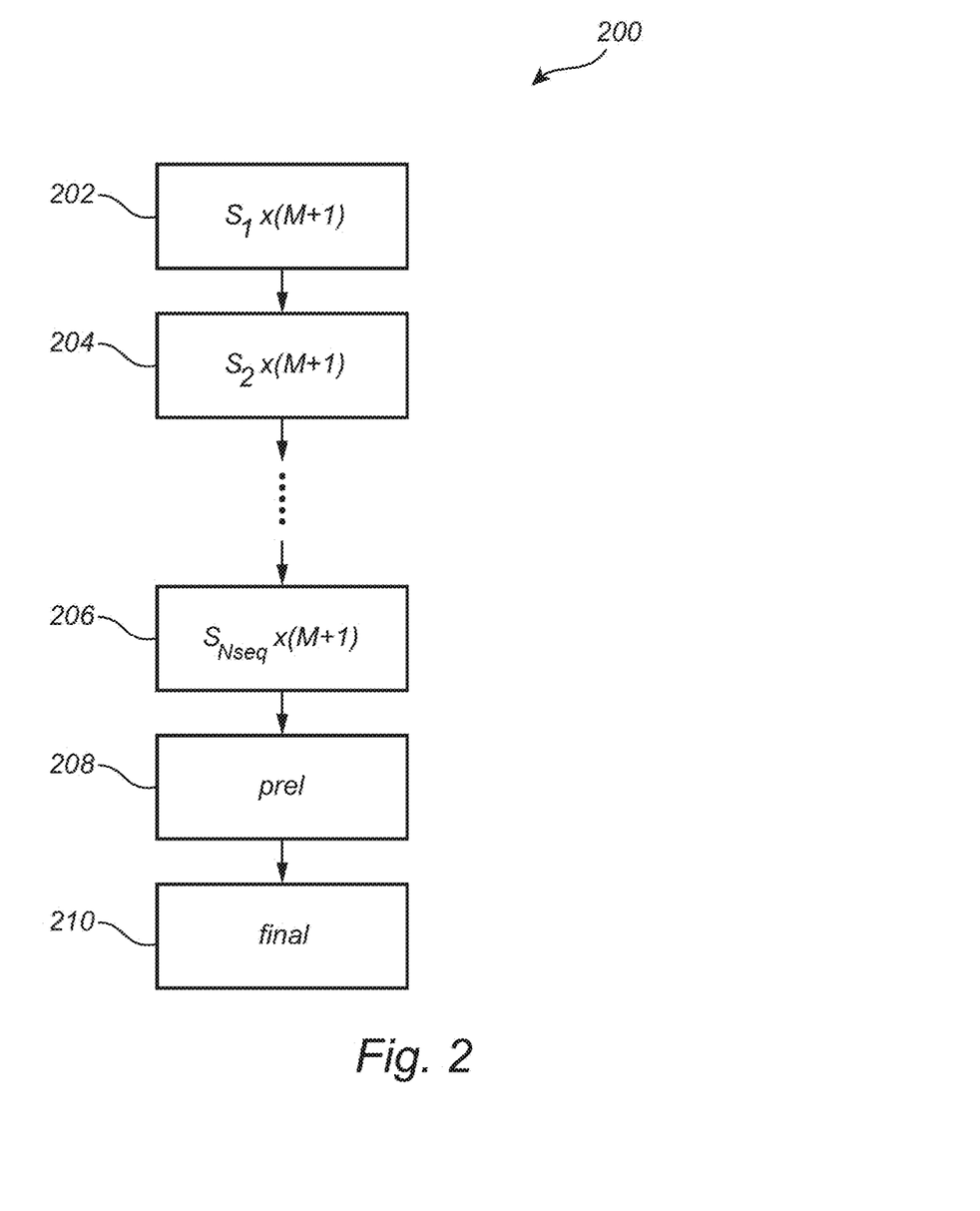
FIG. 2 schematically shows a method example of radar ranging.

FIG. 2 schematically shows a method example 200 of radar ranging utilizing the radar system 100 of FIG. 1.

The method example 200 involves transmitting a digitally-modulated signal comprising, successively in time, a plurality of sequences $S_1, S_2, \ldots, S_{Nseq}$, wherein at least one of each sequence in the plurality of sequences is different from every other sequence of the plurality of sequences, and, in some examples, all sequences of the plurality of sequences are different from each other. Each sequence $S_1, S_2, \ldots, S_{Nseq}$ in the plurality of sequences may comprise a same number $L_c$ of digitally modulated chips. Further, transmission of each sequence may be repeated a same number M+1 of times.

The numbers $N_{seq}$, $L_c$, and M may be chosen according to need.

Each sequence can be chosen as any succession of digital-modulation chips. In some examples, each sequence is selected to have as low periodic autocorrelation as possible. Standard sequence types having such properties are, with a large number of different sequences available of a given length $L_c$ known per se. Each such sequence may, for example, be an m-sequence or an almost-perfect sequence (APS).

The chips may be modulated using phase-modulated continuous wave, PMCW, modulation, where each digitally-modulated chip may signify either transmission of a nominal phase carrier or transmission of a reversed-phase carrier, i.e., with a 180-degree phase shift as compared to the nominal phase carrier.

For PMCW modulation, in each transmitter, the sequences to be transmitted may be defined in the time domain and transmitted after pulse shaping.

Alternatively, the chips may be modulated using orthogonal frequency division multiplex, OFDM, modulation, as known per se.

Each digitally-modulated chip may signify, for each OFDM sub-carrier, a phase shift, while each OFDM sub-carrier may have the same amplitude as the other OFDM sub-carriers.

For OFDM modulation, in each transmitter, the sequence to be transmitted may be defined in the frequency domain and converted to the time domain for transmission.

At 202, a first sequence $S_1$, consisting of a number $L_c$ of digitally-modulated chips, is transmitted M+1 times by one or more transmitters 102, 104, 106, 108, scattered by one or more targets 120 (cf. FIG. 1) and received by one or more receivers 152, 154, 156, 158.

Subsequently, at 204, a second sequence $S_2$, as well consisting of $L_c$ digitally-modulated chips, is transmitted M+1 times by the one or more transmitters 102, 104, 106, 108, scattered by the one or more targets 120 (cf. FIG. 1) and received by the one or more receivers 152, 154, 156, 158.

As indicated in FIG. 2 by an ellipsis, further sequences $S_3$, $S_4 \ldots$ (not shown) may be transmitted and received in the same way, until, at 206, a final sequence $S_{Nseq}$, as well consisting of $L_c$ digitally-modulated chips, is transmitted M+1 times by the one or more transmitters 152, 154, 156, 158, scattered by the one or more targets 120 (cf. FIG. 1) and received by the one or more receivers 152, 154, 156, 158.

Thus, for each sequence $S_1, S_2, \ldots, S_{Nseq}$, forming a plurality of $N_{seq}$ sequences, M+1 repeats of the sequence are transmitted, successively in time so that transmission of the repeats of one sequence is finished before starting transmission of the repeats of the next sequence.

At 208, for each sequence in the plurality of sequences $S_1, S_2, \ldots, S_{Nseq}$, the processor 130 performs a preliminary target estimation.

The preliminary target estimation may be a target range profile, i.e., a function of ranger numerically indicating the presence of one or more targets 120 (cf. FIG. 1).

The target range profile may be estimated using methods known per se.

In the case of PMCW modulation, the target range profile may be estimated using time domain correlators.

Alternatively, for both the case of OFDM modulation and of PMCW modulation, the target range profile may be estimated through conversion to the frequency domain, removal of a reference sequence and conversion to time domain.

The target range profile may be binned, i.e., comprising a number of discrete values.

At 210, the processor 130, using each preliminary target estimation performed at 208 for each respective sequence $S_1, S_2, \ldots, S_{Nseq}$, performs a final target estimation.

The final target estimation may be another range profile, formed from range profiles comprised in the preliminary target estimations, for example through averaging.

Alternatively, the final target estimation may be a range-doppler map, i.e., a two-dimensional function of range r and radial velocity $v_r$.

The range-doppler map may be formed through doppler processing, as known per se, such as by Discrete Fourier Transform of range profiles comprised in the preliminary target estimations.

The range-doppler map may be binned.

Generally, in a radar system 100 comprising $N_{tx}$ transmitters, for acquisition of data corresponding N doppler bins, at total of $N_{seq}=N \times N_{tx}$ sequences may be transmitted.

Alternatively again, the final target estimation may be a range-doppler-angle map, such as a range-doppler-azimuth-elevation map, i.e., a four-dimensional function of range r, radial velocity $v_r$, azimuth angle az, and elevation angle el.

The range-doppler-angle map may be formed through doppler processing, as known per se, such as by Discrete Fourier Transform of range profiles comprised in the preliminary target estimations, combined with angular processing techniques, as known per se, such as angular processing with conventional beamforming or MIMO techniques.

The range-doppler-angle or range-doppler-azimuth-elevation map may be binned.

Due to interruption of cyclicity at every change of sequences, of the M+1 repeats of each sequence transmitted, one repeat of the sequence may be discarded, so that M repeats of the sequence are used in the preliminary target estimation at 208.

Steps 202-206 are performed sequentially in time. Steps 208 and 210 may be performed after steps 202-210, or alternatively, wholly or in part simultaneously with one or more of steps 202-206.

At each application of the method 200, the order of sequences in the plurality of sequences may be randomized with respect to a nominal order or the sequences.

With ideal transmitters and receivers, the response to a point target creates a sharp peak in a range profile, range-doppler map or range-doppler-angle map, with a possible presence of sidelobes.

Due to non-idealities in the transmitter and/or receiver, such as front-end non-idealities, the response may typically degrade, manifesting itself by the appearance of ghost targets and/or an increase of the sidelobes. Such sources of non-idealities may be phase noise, I/Q mismatch, non-linearities and ADC/DAC integral or differential non-linearity.

In addition, PMCW and OFDM radars are typically designed to give the lowest range sidelobes for static targets. When a target is moving with respect to the radar, the Doppler effect can also create range side lobes which are added to the ones due to transmitter and/or receiver non-idealities.

If sequences used produce sidelobes in the presence of transmitter and/or receiver non-idealities and/or moving targets, for example APS sequences, these sidelobes may be attenuated by a factor $10 \times \log 10(N_{seq})$, if all $N_{seq}$ sequences are different.

If sequences used produce ghosts in the presence of transmitter and/or receiver non-idealities, for example m-sequences, the position of the ghosts will depend on the sequence. As a consequence, the amplitude of the ghosts will decrease by a factor $20 \times \log_{10}(N_{seq})$, if all $N_{seq}$ sequences are different.

Figure 3:
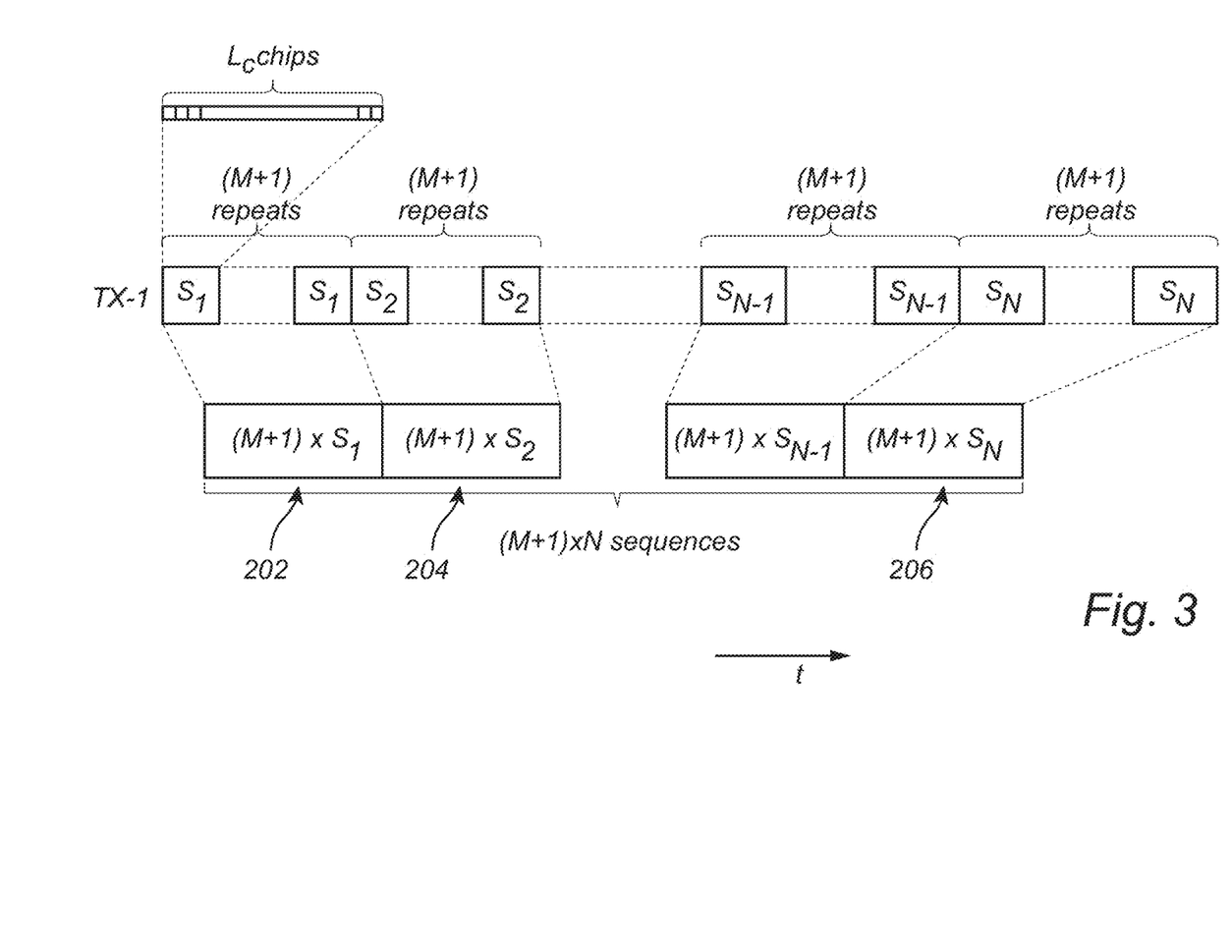
FIG. 3 is a timing diagram of a first method example of radar ranging, applying the method example of FIG. 2.

FIG. 3 is a timing diagram of a first method example 300 of radar ranging, applying the method example 200 of FIG. 2 in a single-in single-out (SISO) use case, the radar system 100 thus having a single transmitter TX-1 102 and a single receiver RX-1 152 (cf. FIG. 1).

Thus, at 202, the repeats of the first sequence S1 are transmitted by the transmitter TX-1 102 and received by the receiver RX-1 152.

Subsequently, at 204, the repeats of the second sequence $S_2$ are transmitted by the transmitter TX-1 102 and received by the receiver RX-1 152.

As indicated in FIG. 3 by an ellipsis, repeats of further sequences $S_3$, $S_4$ (not shown) ... $S_{Nseq-1}$ may be transmitted in the same way, until, at 206, repeats of the final sequence $S_{Nseq}$ (wherein, here, $N_{seq}$=N) is transmitted by the transmitter TX-1 102 (cf. FIG. 1) and received by the receiver RX-1 152 (cf. FIG. 1).

Figure 4:
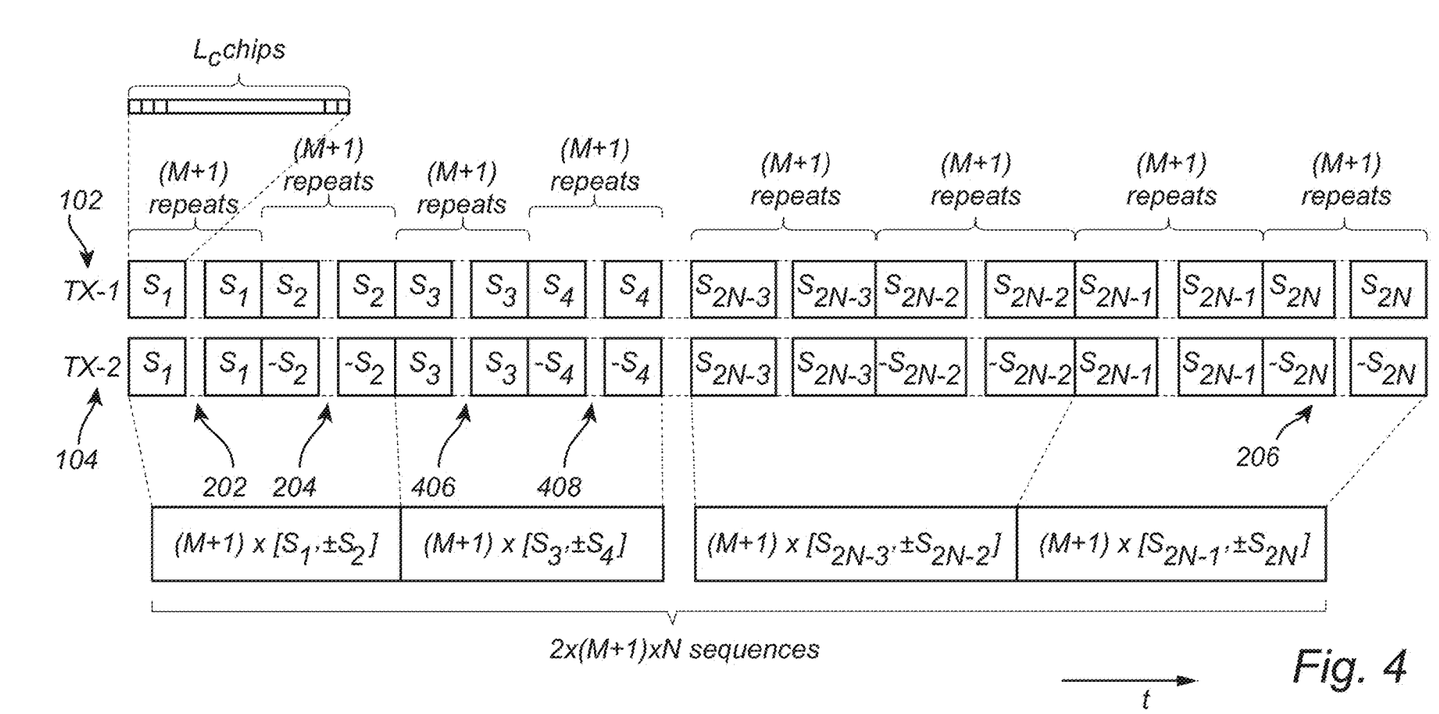
FIG. 4 is a timing diagram of a second method example employing multiple-in multiple-out (MIMO) radar ranging, applying the method example of FIG. 2.

FIG. 4 is a timing diagram of a second method example 400 of radar ranging, applying the method example 200 in a 2×2 MIMO use case, the radar system 100 thus having $N_{tx}$=2 transmitters TX-1 102 and TX-2 104 and two receivers RX-1 152 and RX-2 154 (cf. FIG. 1).

Accordingly, for allowing acquisition of N doppler bins, $N_{seq}$=2N sequences are transmitted.

Each sequence $S_1$, $S_2$, ..., $S_{2N}$ is simultaneously transmitted by the first transmitter TX-1 and the second transmitter TX2.

At 202, the first sequence $S_1$ is transmitted by the first transmitter TX-1 102 and the second transmitter TX-2 104 and received by the first receiver RX-1 152 and the second receiver RX-2 154 (cf. FIG. 1). Both the first transmitter TX-1 102 and the second transmitter TX-2 104 transmit each chip of the repeats of the first sequence $S_1$ with nominal phase.

Subsequently, at 204, the second sequence $S_2$ is transmitted by the first transmitter TX-1 102 and the second transmitter TX-2 104 (cf. FIG. 1) and received by the first receiver RX-1 152 and the second receiver RX-2 154 (cf. FIG. 1). The first transmitter TX-1 102 transmits each chip of the repeats of the second sequence $S_2$ with nominal phase, while the second transmitter TX-2 104 transmits each chip of each repeat of the second sequence $S_2$ phase reversed, as indicated by a minus sign: "$-S_2$".

At 406, after 204, but before 206 (cf. FIG. 2), the third sequence $S_3$ is transmitted by the first transmitter TX-1 102 and the second transmitter TX-2 104 (cf. FIG. 1) and received by the first receiver RX-1 152 and the second receiver RX-2 154 (cf. FIG. 1). The first transmitter TX-1 102 transmits each chip of the repeats of the third sequence $S_3$ with nominal phase and the second transmitter TX-2 104 transmits each chip of the third sequence $S_3$ with nominal phase, as indicated by the absence of a minus sign: "$S_3$".

At 408, after 406, but before 206 (cf. FIG. 2), the fourth sequence $S_4$ is transmitted by the first transmitter TX-1 102 and the second transmitter TX-2 104 (cf. FIG. 1) and received by the first receiver RX-1 152 and the second receiver RX-2 154 (cf. FIG. 1). The first transmitter TX-1 102 transmits each chip of the repeats of the forth sequence $S_4$ with nominal phase, while the second transmitter TX-2 104 transmits each chip of the repeats of the fourth sequence $S_4$ phase reversed, as indicated by a minus sign: "$-S_4$".

Thus, for every other sequence $S_2$, $S_4$, $S_6$ ... $S_{2N}$ of the plurality of sequences $S_1$, $S_2$, $S_3$, ..., $S_{2N}$, the second transmitter TX-2 104 (cf. FIG. 1) transmits each chip of the repeats of the sequence phase reversed and for the other sequences $S_1$, $S_3$, $S_5$, ... $S_{N-1}$, the second transmitter TX-2 104 (cf. FIG. 1) transmits each chip of the repeats of the sequence with nominal phase. At the same time, the first transmitter TX-1 102 transmits the chips of each repeat of each sequence at nominal phase.

This continues until, at 206, the final sequence $S_{2N}$ is transmitted by the first transmitter TX-1 102 and the second transmitter TX-2 104 (cf. FIG. 1) and received by the first receiver RX-1 152 and the second receiver RX-2 154 (cf. FIG. 1). The second transmitter TX-2 104 transmits each chip of the repeats of the final sequence $S_{2N}$ phase reversed, as indicated by a minus sign: $-S_{2N}$.

A general case of transmitting the sequences of the plurality of sequences as modified by an outer orthogonal code will now be described in conjunction with FIG. 5, which is a timing diagram of a third method example 500 of radar ranging, applying the method example 200 in a 4×4 MIMO use case, the radar system 100 having four transmitters TX-1 102, TX-2 104, TX-3 106, and Tx-4 108 and four receivers RX-1 152, RX-2 154, RX-3 156, and RX-4 158 (cf. FIG. 1).

In the third method example 500, the repeats of each sequence $S_1$, $S_2$, $S_3$ ... $S_{Nseq}$ are simultaneously transmitted by the first transmitter TX-1 102, the second transmitter TX-2 104, the third transmitter TX-3 106, and the fourth transmitter TX-4 108 as modified by an outer orthogonal code, orthogonalizing the transmissions by each transmitter.

The orthogonal outer code may be represented by a matrix with orthogonal rows, for example a Hadamard matrix, as known per se.

The matrix may have as many rows and columns as the number of transmitters, in the third method example 500 four transmitters.

As an example used in the following, such a Hadamard matrix of order four may be written as follows:

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}.$$

Generally, Hadamard matrices may be constructed of order 2, and of every order that is a multiple of four. The matrices with an order of $2^k$ (with k>1) can be constructed as follows:

$$H_{2^k} = \begin{bmatrix} H_{2^{k-1}} & H_{2^{k-1}} \\ H_{2^{k-1}} & -H_{2^{k-1}} \end{bmatrix}.$$

During transmission of the repeats of the sequences $S_1$, $S_2$, $S_3$ ... $S_{Nseq}$ in the plurality of sequences, transmission of the repeats of each sequence is modified, for each respective transmitter, by the numbers along a column of the outer code matrix, where a "1" indicates transmission at nominal phase and a "−1" indicates phase reversal, each column used alternately in succession, as will be exemplified in the following with reference to FIG. 5.

Since, in this example, $N_{tx}$=4, accordingly, for allowing acquisition of N doppler bins, $N_{seq}$=4N sequences are transmitted.

Thus, at 202, the repeats of the first sequence $S_1$ are transmitted by the first transmitter TX-1 102, the second transmitter TX-2 104, the third transmitter TX-3 106, and the fourth transmitter TX-4 108, and received by the first receiver RX-1 152, the second receiver RX-2 154, the third receiver RX-3 156 and the fourth receiver RX-4 158 (cf. FIG. 1). As the first row of the matrix $H_4$ all contain "1"s, all transmitters transmit the chips of the repeats of the sequence $S_1$ with nominal phase.

Subsequently, at 204, the repeats of the second sequence $S_2$ are transmitted by the first transmitter TX-1 102, the second transmitter TX-2 104, the third transmitter TX-3 106, and the fourth transmitter TX-4 108, and received by the first receiver RX-1 152, the second receiver RX-2 154, the third receiver RX-3 156 and the fourth receiver RX-4 158 (cf. FIG. 1). As the first and third rows of the second column of the matrix $H_4$ contain "−1"s and the second and fourth rows contain "1"s, the first transmitter TX-1 102 and the third transmitter TX-3 106 transmit the chips of the repeats of the sequence $S_2$ with nominal phase and the first transmitter TX-1 102 and the third transmitter TX-3 106 transmit the chips of the repeats of the sequence $S_2$ with reversed phase.

Subsequently, at 506, after 204, but before 206 (cf. FIG. 2), the third sequence $S_3$ is transmitted by the first transmitter TX-1 102, the second transmitter TX-2 104 (cf. FIG. 1), the third transmitter TX-3 106, and the fourth transmitter TX-4 108, and received by the first receiver RX-1 152, the second receiver RX-2 154, the third receiver RX-3 156 and the fourth receiver RX-4 158 (cf. FIG. 1). As the third and fourth rows of the third column of the matrix $H_4$ contain "−1"s and the first and second rows contain "1"s, the first transmitter TX-1 102 and the third transmitter TX-3 106 transmit the chips of the repeats of the sequence $S_3$ with nominal phase and the first transmitter TX-1 102 and the third transmitter TX-3 106 transmit the chips of the repeats of the sequence $S_3$ with reversed phase.

Subsequently, at 508, after 506, but before 206 (cf. FIG. 2), the fourth sequence $S_4$ is transmitted by the first transmitter TX-1 102, the second transmitter TX-2 104, the third transmitter TX-3 106, and the fourth transmitter TX-4 108, and received by the first receiver RX-1 152, the second receiver RX-2 154, the third receiver RX-3 156 and the fourth receiver RX-4 158 (cf. FIG. 1). As the second and third rows of the fourth column of the matrix $H_4$ contain "−1"s and the first and fourth rows contain "1"s, the second transmitter TX-2 104 and the third transmitter TX-3 106 transmit the chips of the repeats of the sequence $S_4$ with nominal phase and the first transmitter TX-1 102 and the fourth transmitter TX-4 106 transmit the chips of the repeats of the sequence $S_4$ with reversed phase.

Subsequently (not shown), the fifth sequence $S_5$ is transmitted as modified by the first column of the matrix $H_4$, the sixth sequence $S_6$ is transmitted as modified by the second column of the matrix $H_4$, the seventh sequence $S_7$ is transmitted as modified by the third column of the matrix $H_4$, and the eight sequence $S_8$ is transmitted as modified by the fourth column of the matrix $H_4$, and so on.

Generally, with $N_{seq}=N_{tx} \times N$ sequences to transmit, and thus an $N_{tx}$-dimensional outer code matrix H, sequences $S_1$, $S_{Ntx+1}$, $S_{2Ntx+1}$, $S_{3Ntx+1}$, ..., $S_{(N-1) \times Ntx+1}$ are transmitted by transmitters TX-1, TX-2, ..., TX-$N_{tx}$ as modified, respectively, by each row of the first column of the matrix $H_{Ntx}$; sequences $S_2$, $S_{2Ntx+2}$, $S_{3Ntx+2}$, $S_{4Ntx+2}$, ..., $S_{(N-1) \times Ntx+2}$ are transmitted as modified by the second row of $H_{Ntx}$, and so on, with the sequences $S_{Ntx}$, $S_{2Ntx}$, $S_{3Ntx}$, ..., $S_{N \times Ntx}$ transmitted as modified by the final column of the matrix $H_{Ntx}$.

The method example 400 above in conjunction with FIG. 4 represents a special case of transmitting the sequences of the plurality of sequences as modified by an outer orthogonal code represented by the Hadamard matrix.

$$H_2 = \begin{bmatrix} 1 & 1 \\ 1 & -1 \end{bmatrix}.$$

Thus, in both the second method example 400 and the third method example 500, the digitally-modulated signal is concurrently transmitted by a plurality of transmitters, wherein each sequence of the plurality of sequences, as transmitted by each transmitter of the plurality of transmitters, is modified by an orthogonal outer code.

Figure 6:
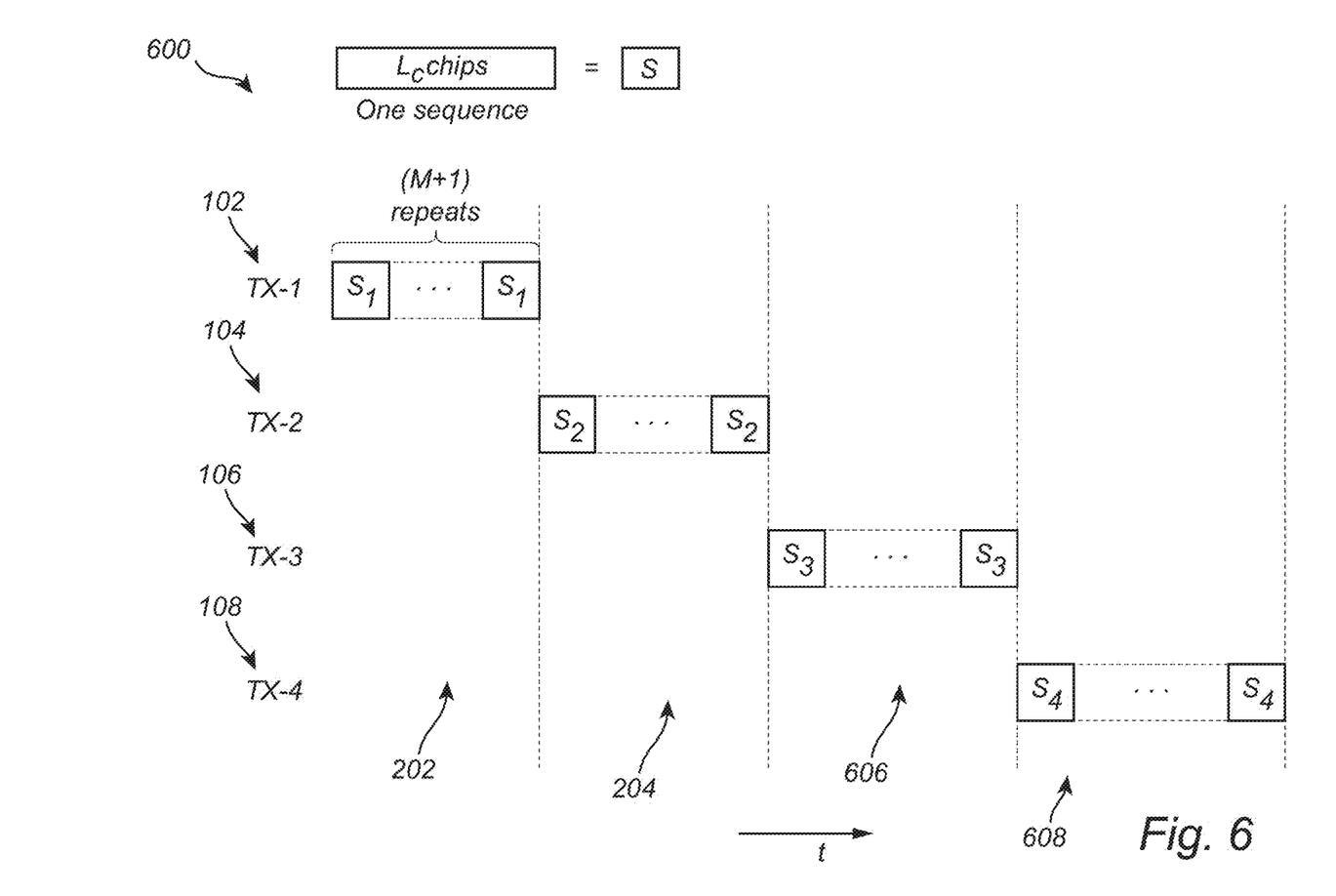
FIG. 6 is a timing diagram of a fourth method example employing MIMO radar ranging, applying the method example of FIG. 2

FIG. 6 is a timing diagram of a fourth method example 600 of radar ranging, applying the method example 200 in a 4×4 time-domain MIMO use case, the radar system 100 having four transmitters TX-1 102, TX-2 104, TX-3 106, and Tx-4 108 and four receivers RX-1 152. RX-2 154, RX-3 156, and RX-4 158 (cf. FIG. 1).

In the fourth method example 600, sequences of the plurality of sequences of the digitally-modulated signal are alternatingly transmitted by the transmitters TX-1 102, TX-2 104, TX-3 106, and Tx-4 108.

Since, in this example, $N_{tx}$=4, accordingly, for allowing acquisition of N doppler bins, $N_{seq}$=4N sequences are transmitted.

Thus, at 202, the repeats of the first sequence S1 are transmitted by the first transmitter TX-1 102, and may be received by one or more of the first receiver RX-1 152, the second receiver RX-2 154, the third receiver RX-3 156 and the fourth receiver RX-4 158 (cf. FIG. 1). The second transmitter TX-2 104, the third transmitter TX-3 106, and the fourth transmitter TX-4 108 are silent.

Subsequently, at 204, the repeats of the second sequence S₂ are transmitted by the second transmitter TX-1 102, and may be received by one or more of the first receiver RX-1 152, the second receiver RX-2 154, the third receiver RX-3 156 and the fourth receiver RX-4 158 (cf. FIG. 1). The first transmitter TX-1 102, the third transmitter TX-3 106, and the fourth transmitter TX-4 108 are silent.

Subsequently, at 606, after 204, but before 206 (cf. FIG. 2), the repeats of the third sequence S3 are transmitted by the third transmitter TX-3 106, and may be received by one or more of the first receiver RX-1 152, the second receiver RX-2 154, the third receiver RX-3 156 and the fourth receiver RX-4 158 (cf. FIG. 1). The first transmitter TX-1 102, the second transmitter TX-2 104, and the fourth transmitter TX-4 108 are silent.

Subsequently, at 608, after 606, but before 206, the repeats of the fourth sequence S4 are transmitted by the fourth transmitter TX-4 108, and may be received by one or more of the first receiver RX-1 152, the second receiver RX-2 154, the third receiver RX-3 156 and the fourth receiver RX-4 158 (cf. FIG. 1). The first transmitter TX-1 102, the second transmitter TX-2 104, and the third transmitter TX-3 106 are silent.

Generally, with $N_{seq}=N_{tx} \times N$ sequences to transmit, the repeats of the sequences $S_1$, $S_{Ntx+1}$, $S_{2Ntx+1}$, $S_{3Ntx+1}$, ..., $S_{(N-1) \times Ntx+1}$ are transmitted by the first transmitter TX-1 102, the repeats of the sequences $S_2$, $S_{2Ntx+2}$, $S_{3Ntx+2}$, $S_{4Ntx+2}$, ..., $S_{(N-1) \times Ntx+2}$ are transmitted by the second transmitter TX-2 104, and so on, with the sequences $S_{Ntx}$, $S_{2Ntx}$, $S_{3Ntx}$, ..., $S_{N \times Ntx}$ transmitted by the last transmitter TX-$N_{tx}$.

Figure 5:
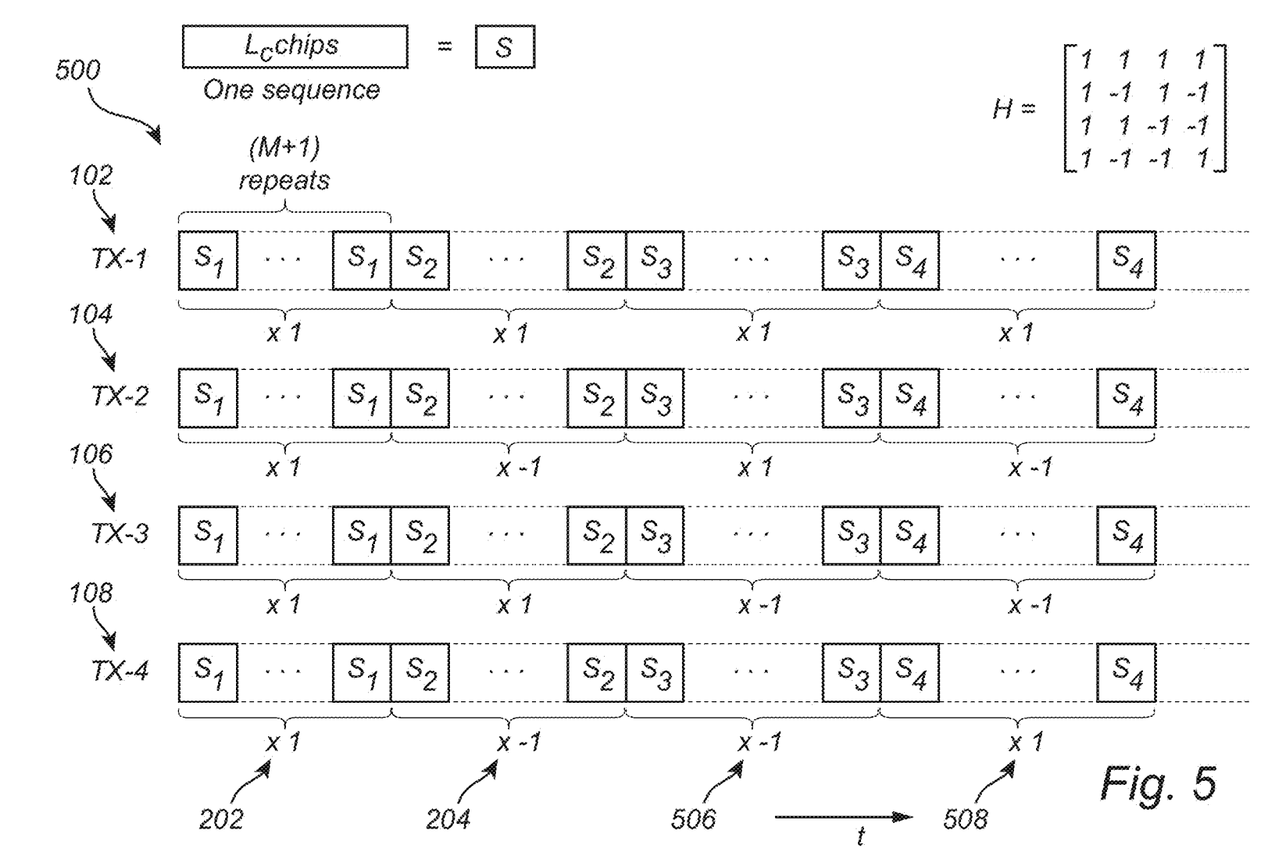
FIG. 5 is a timing diagram of a third method example employing MIMO radar ranging, applying the method example of FIG. 2.

This can be seen to be a special case of transmission of the sequences as modified by an orthogonal outer code, as described above for the third method example 500 in conjunction with FIG. 5, with a diagonal outer code matrix $$H_{TD} = \begin{bmatrix} 1 & 0 & 0 & 0 \\ 0 & 1 & 0 & 0 \\ 0 & 0 & 1 & 0 \\ 0 & 0 & 0 & 1 \end{bmatrix},$$

wherein a "0" indicates the respective transmitter being silent.

Other examples than the ones disclosed above are equally possible within the scope of the present disclosure, as defined by the appended claims.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A method of radar ranging, comprising:
transmitting a digitally-modulated signal comprising, successively in time, for each sequence in a plurality $N_{seq}$ of different sequences, a plurality M+1 of repeats of said sequence, wherein each sequence consists of a plurality $L_c$ of digitally-modulated chips, wherein at least one sequence in the plurality of sequences is different from another sequence in the plurality of sequences;
receiving a version of the digitally-modulated signal scattered by one or more physical targets;
attenuating sidelobes by at least a factor $10 \times \log 10(N_{seq})$;
for each sequence in the plurality of sequences, performing a preliminary target estimation using M repeats of said sequence; and
using each preliminary target estimation for all sequences in the plurality of sequences, performing a final target estimation, characterized by each preliminary target estimation being a target range profile and the final target estimation being a range-doppler map or a range-doppler-angle map.

2. The method of claim 1, wherein each sequence in the plurality of sequences is different from every other sequence of the plurality of sequences.

3. The method of claim 1, wherein each of the sequences in the plurality of sequences are m-sequences or almost-perfect sequences, APS.

4. The method of claim 1, wherein the digitally-modulated signal is modulated using phase-modulated continuous wave, PMCW, modulation.

5. The method of claim 4, wherein each the digitally-modulated chip signifies either transmission of a nominal phase carrier or transmission of a reversed-phase carrier.

6. The method of claim 1, wherein the digitally-modulated signal is modulated using orthogonal frequency division multiplex, OFDM, modulation.

7. The method of claim 6, wherein each of the digitally-modulated chip signifies, for each OFDM sub-carrier, a phase shift, each OFDM sub-carrier having a same amplitude.

8. The method of claim 1 employed for multiple-in multiple-out, MIMO, radar ranging.

9. The method of claim 8, wherein the digitally-modulated signal is concurrently transmitted by a plurality of transmitters, wherein each sequence of the plurality of sequences, as transmitted by each transmitter of the plurality of transmitters, is modified by an orthogonal outer code.

10. The method of any one of claim 8, wherein the sequences of the plurality of sequences of the digitally-modulated signal are alternatingly transmitted by each transmitter of a plurality of transmitters.

11. The method of claim 1, wherein the plurality $N_{seq}$ of sequences are different, the method further comprising: decreasing an amplitude of ghosts by a factor $20 \times \log 10(N_{seq})$.

12. The method of claim 1, further comprising: discarding one repeat of the plurality M+1 of repeats of said sequence such that M repeats of said sequence is formed.

13. A method of radar ranging, comprising:
receiving a scattered digitally-modulated signal comprising, successively in time, for each sequence in a plurality $N_{seq}$ of different sequences, a plurality M+1 of repeats of the sequence, wherein each sequence consists of a plurality $L_c$ of digitally-modulated chips, wherein at least one sequence in the plurality of sequences is different from another sequence in the plurality of sequences;
attenuating sidelobes by at least a factor $10 \times \log 10(N_{seq})$,
for each sequence in the plurality of sequences, performing a preliminary target estimation using M repeats of said sequence; and
using each preliminary target range estimation for all sequences in the plurality of sequences, performing a final target estimation, characterized by each preliminary target estimation being a target range profile and the final target estimation being a range-doppler map or a range-doppler-angle map.

14. A receiver for radar ranging, configured to:
receive a scattered digitally-modulated signal comprising, successively in time, for each sequence in a plurality $N_{seq}$ of different sequences, a plurality M+1 of repeats of the sequence, wherein each sequence consists of a plurality $L_c$ of digitally-modulated chips, and wherein at least one sequence in said plurality of sequences is different from another sequence in said plurality of sequences;
attenuate sidelobes by at least a factor $10 \times \log 10(N_{seq})$;
for each sequence in the plurality of sequences, perform a preliminary target estimation using M repeats of said sequence; and
using each preliminary target range estimation for all sequences in the plurality of sequences, perform a final target estimation, characterized by each preliminary target estimation being a target range profile and the final target estimation being a range-doppler map or a range-doppler-angle map.

15. The receiver for radar ranging of claim 14, wherein the range-doppler-angle map comprises a range-doppler-azimuth-elevation map.

16. The method of claim 1, wherein the range-doppler-angle map comprises a range-doppler-azimuth-elevation map.

17. The method of claim 13, wherein the range-doppler-angle map comprises a range-doppler-azimuth-elevation map.

* * * * *